US012597737B2

(12) United States Patent
Simbürger et al.

(10) Patent No.: US 12,597,737 B2
(45) Date of Patent: Apr. 7, 2026

(54) ELECTRICAL CONNECTOR AND CONNECTOR SYSTEM

(71) Applicant: Franz Binder GmbH + Co. Elektrische Bauelemente KG, Neckarsulm (DE)

(72) Inventors: Matthias Simbürger, Rottenburg an der Laaber (DE); Michael Schneider, Rieden am Forgensee (DE); Peter Ebert, Kraichtal (DE)

(73) Assignee: Franz Binder GmbH + Co. Elektrische Bauelemente KG, Neckarsulm (DE)

( * ) Notice: Subject to any disclaimer, the term of this patent is extended or adjusted under 35 U.S.C. 154(b) by 348 days.

(21) Appl. No.: 18/448,663

(22) Filed: Aug. 11, 2023

(65) Prior Publication Data

US 2024/0063574 A1 Feb. 22, 2024

(30) Foreign Application Priority Data

Aug. 16, 2022 (DE) ..................... 10 2022 208 502.7

(51) Int. Cl.

| | |
|---|---|
| ***H01R 13/62*** | (2006.01) |
| ***H01R 13/627*** | (2006.01) |
| ***H01R 13/629*** | (2006.01) |
| ***H01R 13/641*** | (2006.01) |

(52) U.S. Cl.

CPC ... *H01R 13/6273* (2013.01); *H01R 13/62938* (2013.01); *H01R 13/62955* (2013.01); *H01R 13/641* (2013.01)

(58) Field of Classification Search

CPC .................................... H01R 13/62933–62944

See application file for complete search history.

(56) References Cited

U.S. PATENT DOCUMENTS

| | | | |
|---|---|---|---|
| 5,538,437 | A | 7/1996 | Bates, III et al. |
| 2014/0292276 | A1 | 10/2014 | Osawa et al. |
| 2019/0123483 | A1 | 4/2019 | Probert et al. |

FOREIGN PATENT DOCUMENTS

| | | |
|---|---|---|
| EP | 1 093 191 A2 | 4/2001 |
| EP | 3 955 395 A1 | 2/2022 |

*Primary Examiner* — Ross N Gushi

(74) *Attorney, Agent, or Firm* — Seed Intellectual Property Law Group LLP

(57) ABSTRACT

An electrical connector, in particular for signal and/or power transmission, preferably for charging electric vehicles or of accumulators of electrical vehicles, has a coupling housing for connection to a corresponding second electrical connector. A locking clip on the coupling housing can be moved from an open position to a closed position. The locking clip has a recess into which a locking element of the second connector can be inserted in the open position of the locking clip, and in the closed position of the locking clip, the locking element is arranged in the recess such that the coupling housing is form-fit and/or force-fit connected to the second connector. A latching apparatus with at least one latching element engages in a latching receptacle of the locking clip in the closed position. An electrically movable locking element is arranged which inhibits movement of the latching element in a locking position.

20 Claims, 7 Drawing Sheets

ELECTRICAL CONNECTOR AND CONNECTOR SYSTEM

BACKGROUND

Technical Field

The present disclosure relates to an electrical connector, in particular for signal and/or current transmission, preferably for charging electric vehicles or accumulators of electric vehicles, with a coupling housing for connection to a corresponding second electrical connector.

Furthermore, the present disclosure relates to a connector system, in particular for signal and/or current transmission, preferably for charging electric vehicles or the batteries of electric vehicles.

Description of the Related Art

A weak point of electromobility in general is currently a too low range of the vehicles or too long charging times. One way to counter detours to charging stations and time wasted at charging stations is to quickly replace the discharged battery with one that is already charged, i.e., the connectors must be easy to handle.

Furthermore, it must be ensured that the electronic systems are shut down before disconnection in order to prevent damage. Only then may the contact be separated to avoid possible damage to the electronics.

Since in given connector systems the high-voltage lines and signal lines are disconnected at the same time, there is a risk of arcing, sparking or the generation of voltage spikes, which must be avoided. To improve ease of use, a locking bracket is therefore used which pulls the second connector towards the coupling housing when it is closed. Thus, the present disclosure also relates to a compact battery connector with a quick-locking system and a controlled interlock, which allows these batteries to be changed quickly and safely.

Reference is made only by way of example to document EP 1 093 191 B1, which shows an electrical connector with a locking clip.

BRIEF SUMMARY

Described herein is a safe electrical connector that can be produced by structurally simple and thus cost-effective means. Furthermore, an improved connector system is specified.

According to the present disclosure, an electrical connector, in particular for signal and/or power transmission, preferably for charging electric vehicles or of accumulators of electrical vehicles, is described, having a coupling housing for connection to a corresponding second electrical connector, wherein a locking clip is arranged on the coupling housing such that it can be moved from an open position into a closed position, wherein the locking clip has a recess into which a locking element of the second connector can be inserted in the open position of the locking clip, and wherein, in the closed position of the locking clip, the locking element is arranged in the recess in such a manner that the coupling housing is positively form-fit and/or force-fit connected to the second connector, wherein a latching apparatus with at least one latching element is arranged on the coupling housing, wherein the latching element engages in a latching receptacle of the locking clip in the closed position of the locking clip, and wherein an electrically movable locking element is arranged which inhibits a movement of the latching element in a locking position.

A connector system, in particular for signal and/or current transmission, preferably for charging electric vehicles or the accumulators of electric vehicles, is also described, comprising an electrical connector as described herein and a second electrical connector having at least one locking element.

In accordance with the disclosure, it has been recognized that by combining a latching connection with a blocking element that inhibits the latching element in the closed position, a controllable locking device or unlocking device can be realized that can be integrated in a shielded and/or unshielded electrical connector in the smallest possible installation space. After the locking clip is closed, the blocking element is moved, for example by an electromechanical actuator, thus mechanically blocking the latching element. This blockage is removed by moving the blocking element to an open position, for example by giving the actuator a control signal again.

The teaching according to the present disclosure is particularly suitable for the realization of a shielded electrical connector suitable for signal and high current transmission, which can be equipped with a timed release. For example, the electrical connector can be used in outdoor applications, particularly for e-vehicles that are also suitable for difficult terrain.

A further advantage of the teaching according to the present disclosure is that the, preferably controllable, locking/unlocking prevents the connector from being disconnected under load without authorization. This prevents voltage peaks from occurring which could lead to a sparkover or possibly to the formation of an arc and thus damage or destroy electronic systems. The connector or connector system at hand may have a large number of contacts whose insertion and extraction forces can add up to a considerable total force. However, the mechanical design of the teaching according to the present disclosure ensures that the operator can lock and unlock the connector quickly, conveniently, and safely. The lockable latching connection also ensures that the connector does not open automatically due to shock and vibration and therefore remains reliably functional and operable at all times.

Since a very compact device according to the disclosure can be structurally assigned, for example, to a clutch housing located on the vehicle, a significant cost reduction can be achieved by the fact that this more expensive device only has to be invested once per vehicle.

In an advantageous manner, the latching mechanism can be designed as an elastic latching element, preferably with a latching hook arranged at the free end. In other words, the latching element may be a snap-action arm, creating an extremely compact latching system. In a further advantageous manner, two latching elements can be arranged, preferably in mirror image of one another. Thus, a snap connection is realized, wherein the blocking element can be arranged between the latching elements in the blocking position, such that the snap connection cannot be released due to the blocking of the latching elements by the blocking element. This has the further advantage that reliable locking is substantially determined by only two tolerance parameters, namely the gap between the latching elements and the diameter of the blocking element. Thus, a simple constructive design is possible. There are also no special requirements for the corresponding components with regard to mounting.

In accordance with an advantageous embodiment, the locking clip may have two side arms and a connection element connecting the side arms. Furthermore, the detent receptacle can be arranged on the connecting element, preferably centrally between the side arms. In particular, the locking receptacle can be realized by a correspondingly-shaped recess in the connecting element, preferably centrally, such that the locking receptacle is an integral part of the locking clip.

Furthermore, it is conceivable that a latching protrusion is designed on the latching receptacle, on which the latching element engages behind in the closed position of the locking clip, preferably with a latching hook. This realizes a secure connection in the sense of a connector. In addition, an insertion slope can be arranged on the latching protrusion of the latching receptacle to facilitate insertion of the latching element. The latching elements can have corresponding insertion slopes.

Advantageously, the latching apparatus may have a sealing element, wherein a passage for the blocking element is designed on the sealing element. Thus, the latching apparatus can additionally fulfill a sealing function, so that a, preferably one-piece, latching and sealing apparatus exists. This enables required protection classes, for example IP67, IP68 and IP69K, to be achieved. In general, penetration of liquids can be prevented both from splash water, during sprinkling and temporary submersion, and during cleaning with a steam jet in the case of the teaching according to the present disclosure. Furthermore, the connector is characterized by good chemical resistance to commercially available cleaning means, particularly with regard to automotive cleaners. There is also good resistance to leaking battery fluids and reliable operation is ensured after longer downtimes. Constructively, the latching apparatus can be designed as a multi-component component, wherein a hard component, which forms the latching area, is molded onto a thermoplastic elastomer and thus fulfills the sealing function. This avoids additional interfaces, which increases safety against penetrating liquids. Further, the cost of the accumulators will be reduced. Chemical resistance is determined in particular by the choice of material for the latching apparatus. For example, polyamide (PA) can be used as the hard component and ethylene-propylene-diene rubber (EPDM) or hydrogenated acrylonitrile butadiene rubber (HNBR) can be used as the soft component. Specifically, at least one, preferably circumferential, sealing lip can be designed on and/or in the passage. Thus, a seal against the blocking element can be realized. Alternatively or additionally, at least one, preferably circumferential, sealing lip can be designed on a side of the sealing element facing away from the latching element.

To realize the most space-saving design possible, the blocking element can be arranged on the coupling housing.

In an advantageous manner, the blocking element can be pin-shaped, elliptical or disc-shaped and/or the blocking element can be designed as an eccentric shaft. Substantially, the blocking element can be moved back and forth from a position blocking the latching element(s) to a position releasing the latching elements. When implemented as an elliptically-shaped, particularly disc-shaped, blocking element, it is conceivable that this can be moved from the blocking position to the release position by rotation, for example through 90° about its center. If the main axis is in the horizontal position, the mechanism may be closed. If the shorter auxiliary axis is in this position, the mechanism may be unlocked. The rotation can preferably be realized by a servomotor or rotary solenoid, wherein other rotary actuators are also conceivable.

In a further advantageous manner, the blocking element can be moved by an electric drive. This can be an actuator, preferably a linear actuator and/or a rotary drive. If the electrical connector is used for an electric vehicle, for example, it is conceivable and advantageous that the actuator can be controlled via the vehicle's on-board electronics. Specifically, a linear solenoid and/or a shape memory actuator and/or a servomotor and/or a rotary solenoid, such as a depressing linear solenoid, can be used.

Another advantage is that an actuator is deliberately used that generates a sound when it is used, so that there is acoustic feedback to the user In a further advantageous manner, a protrusion may be designed on the locking clip, wherein by moving the locking clip into an emergency unlocking position, the latching elements may be pushed away from the blocking element by the protrusion. For this purpose, the locking clip can be pressed in the direction of the coupling housing, for example. Such a design is particularly advantageous in combination with a pressing solenoid or a similarly acting actuator. When energized, these pull back the blocking element so that the latching element or elements are released and the locking clip can be opened. This means that only the latching elements and the latching receptacle remain effective. It is further conceivable to use an elastomer to implement the latching apparatus or latching element(s) so that, when a large force is applied, the latching receptacle compresses the latching arms to release the latch.

In a particularly advantageous manner, an acoustic apparatus and/or an optical apparatus can/can be arranged so that an acoustic and/or optical signal is generated to indicate the closed and/or the open position of the locking clip and/or to indicate a current flow. Thus, the user is easily informed about the state of the connector.

BRIEF DESCRIPTION OF THE SEVERAL VIEWS OF THE DRAWINGS

There are various possibilities for designing and developing the teaching of the present disclosure in an advantageous manner. In connection with the explanation of the preferred exemplary embodiments of the disclosure based upon the drawings, generally preferred embodiments and developments of the teaching are also explained. In the drawings.

DETAILED DESCRIPTION

Figure 1:
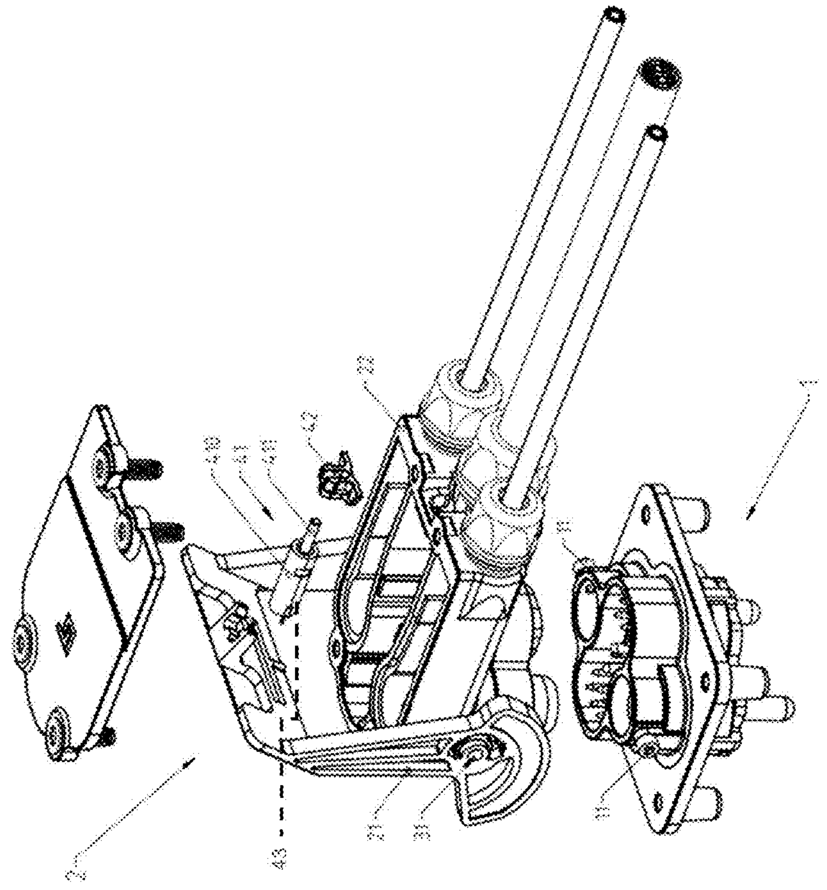
FIG. 1 shows in a schematic diagram an exploded view of an embodiment of a connector system according to the present disclosure.

FIGS. 1 to 8 show an embodiment of a connector system according to the disclosure, which has a connector 2 according to the disclosure and a second connector 1. The same elements are provided with the same reference numerals.

FIG. 1 shows an exploded view of a connector system with an electrical connector 2 according to the disclosure, which has a coupling housing 22 and a locking clip 21, wherein the locking clip 21 comprises two side arms 214 and a connecting element arranged between them. The coupling housing 22 can be closed by means of a housing cover. The locking clip 21 is hinged to the coupling housing 22 via two hinges 31. Furthermore, a second electrical connector 1 is represented. An acoustic and/or optical apparatus 43 may be arranged so that an acoustic and/or optical signal is generated to indicate the closed and/or the open position of the locking clip 21 and/or to indicate a current flow.

The connector according to the disclosure further has an electrical drive 41 or actuator, a latching apparatus 42 and a latching receptacle 211 arranged in the locking clip 21.

Figure 2:
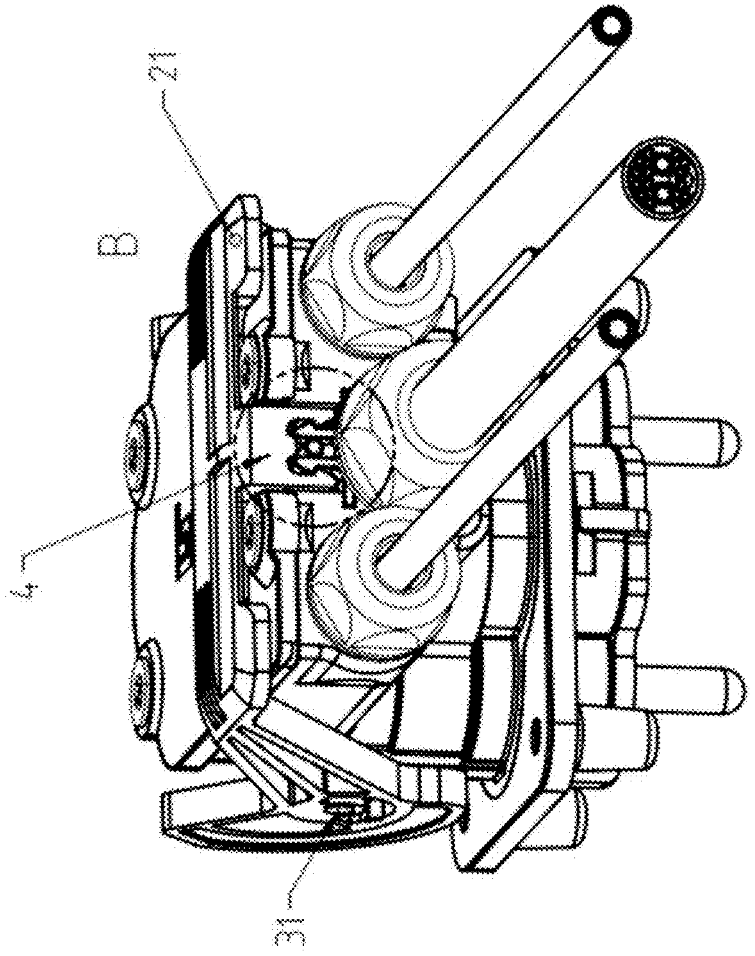
FIG. 2 shows in a schematic diagram a perspective view of the connector system in accordance with FIG. 1.
Figure 3:
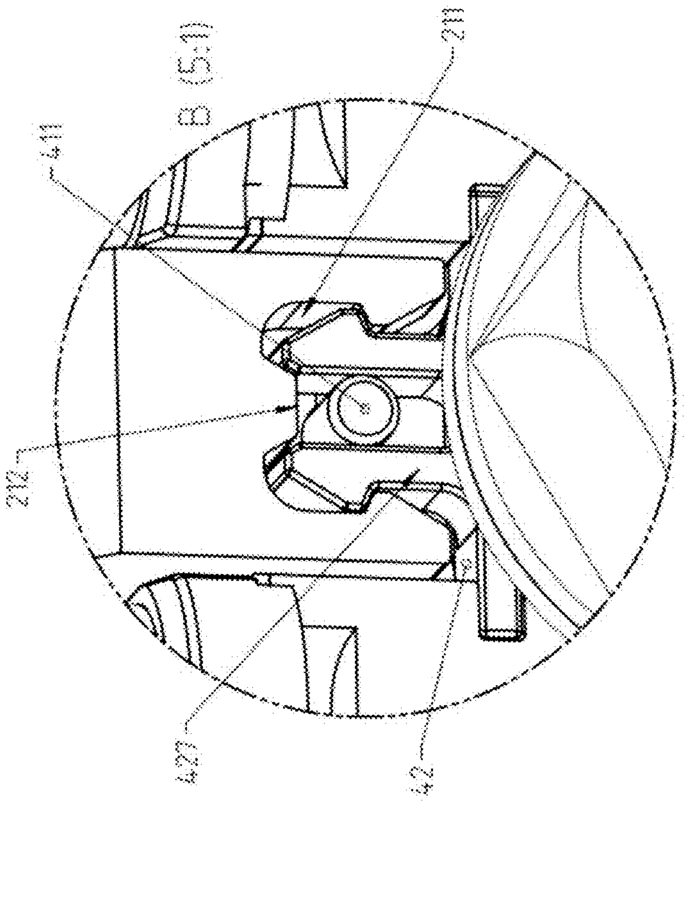
FIG. 3 shows in a schematic diagram an enlarged view of a detail of FIG. 2.
Figure 4:
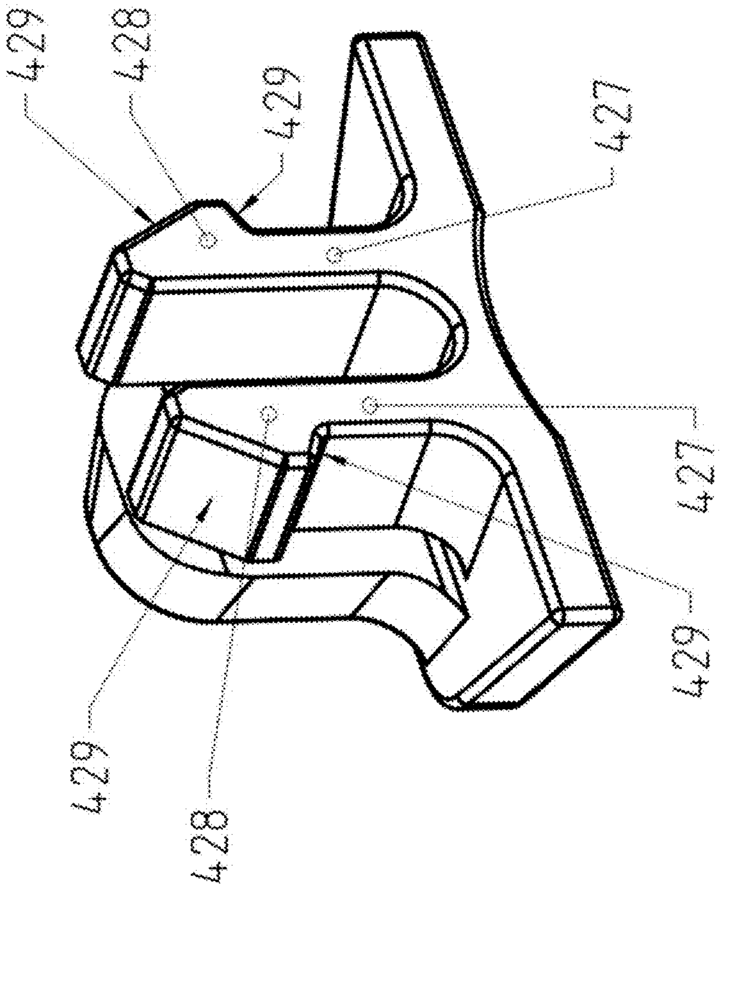
FIG. 4 shows in a schematic diagram a perspective view of the latching apparatus of the connector system in accordance with FIGS. 1 to 3.
Figure 5:
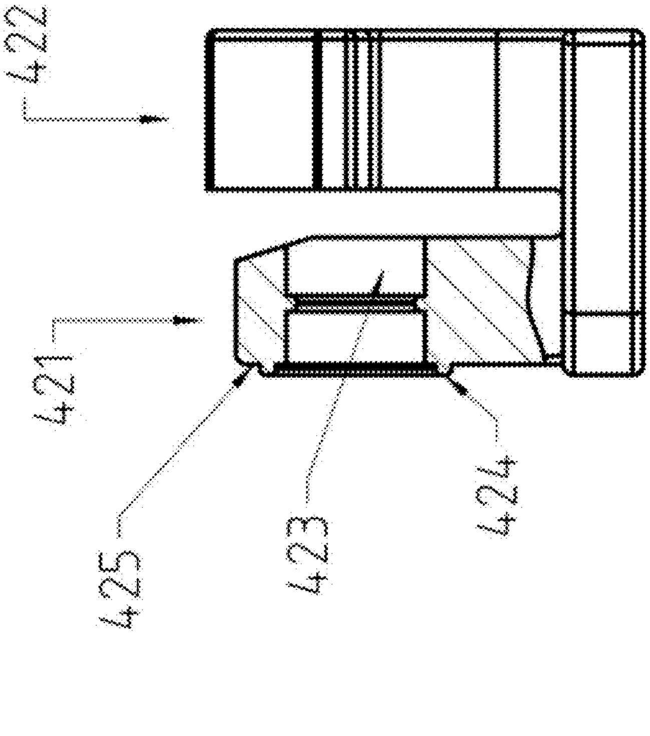
FIG. 5 shows in a schematic diagram a sectional side view of the latching apparatus in accordance with FIG. 4.

FIG. 3 shows an enlarged representation of detail 4 of FIG. 2. This shows that the blocking element 411 of the actuator 41, for example of a solenoid 410, is located in the blocking position between the latching elements 427 of the latching apparatus 42, which are designed as latching arms, and thus blocks any deflection of the latching arms 427 so that unlocking is not possible in this arrangement.

The latching apparatus 42 (cf. FIGS. 4 and 5) has a latching mechanism 422 in the form of two latching elements 427 arranged in mirror image, while a second, sealing part, namely the sealing element 421, implements the housing-side seal or radial seal of the movable blocking element 411. The sealing element 421 has a passage 423 with circumferential sealing lips. Furthermore, a second sealing geometry 424 in the form of circumferential sealing lips is designed on a side 425 facing away from the latching elements 427.

The latching apparatus 42 may preferably be of one-piece construction, for example, multi-component as a hard-soft joint. Without a sealing lip on the flat contact surface 425, an O-ring can in principle still be used directly adjacent.

The latching mechanism 422 is designed by means of two movable latching elements 427 arranged in mirror image. Latching hooks 428 are arranged on each of the latching elements 427. Insertion slopes 429 implemented as chamfers ensure that both engagement and disengagement are optimally possible. For this purpose, the latching elements 427 are designed to be movable, moving along a latching geometry of the latching apparatus 42 during latching or unlatching. Locking is achieved by the interaction of the electromechanical actuator 41 and the blocking element 411.

If the force of the actuator 41 is not sufficient to retract the blocking element 411 during unlocking, for example due to the battery level, a mechanical aid is provided. By pressing down the locking clip 21, the protrusion 212 pushes the two latching elements 427 apart. This exposes the blocking element 411 such that it can retract without force.

Both the movable blocking element 411 and the coupling housing 22 are sealed. The sealing element 421 is pressed against the face side of the coupling housing 22. Furthermore, the latching apparatus 42 may also be manufactured using a multi-component plastic injection molding process. For this purpose, the sealing element 421 can be molded as an elastomer onto the latching elements 427, which are designed as a hard part, for example. In this manner, an optimization of the respective functions can be achieved. Another sealing alternative is also conceivable by bonding the latching apparatus 42 into the coupling housing 22.

The function is thus as follows: When the locking clip 21 is closed, the latching apparatus 42, which is fixedly connected to the coupling housing 22, is received by the latching receptacle 211 located in the locking clip 21. Due to a corresponding constructive design, the locking clip 21 can be realized in such a manner that the closing of the locking clip 21 is comfortably possible even with large insertion forces. With the aid of the locking elements 11 located on the second connector 1, which are designed here, for example, as pins, and a corresponding recess 213, for example notch, in side arms 214 of the locking clip 21, the coupling housing 22 is properly pulled in by the second connector 1.

During both opening and closing, the individual latching elements 427 are positively guided by the latching receptacle 211 of the operating bracket 21. Thus, when the locking clip 21 is closed, the two mirror-image, elastically designed latching arms 427 are pressed together in the area of the latching hooks 428. Corresponding insertion slopes 429 on the latching hooks 428 or on the symmetrically designed inner latching receptacle 211 facilitate insertion. After overcoming the constriction, both latching elements 427 relax again, such that they are arranged in the latching receptacle 211 without further mechanical load. The actual locking of the locking clip 21 is then performed by blocking the latching elements 427 by means of the blocking element 411.

Figure 6:
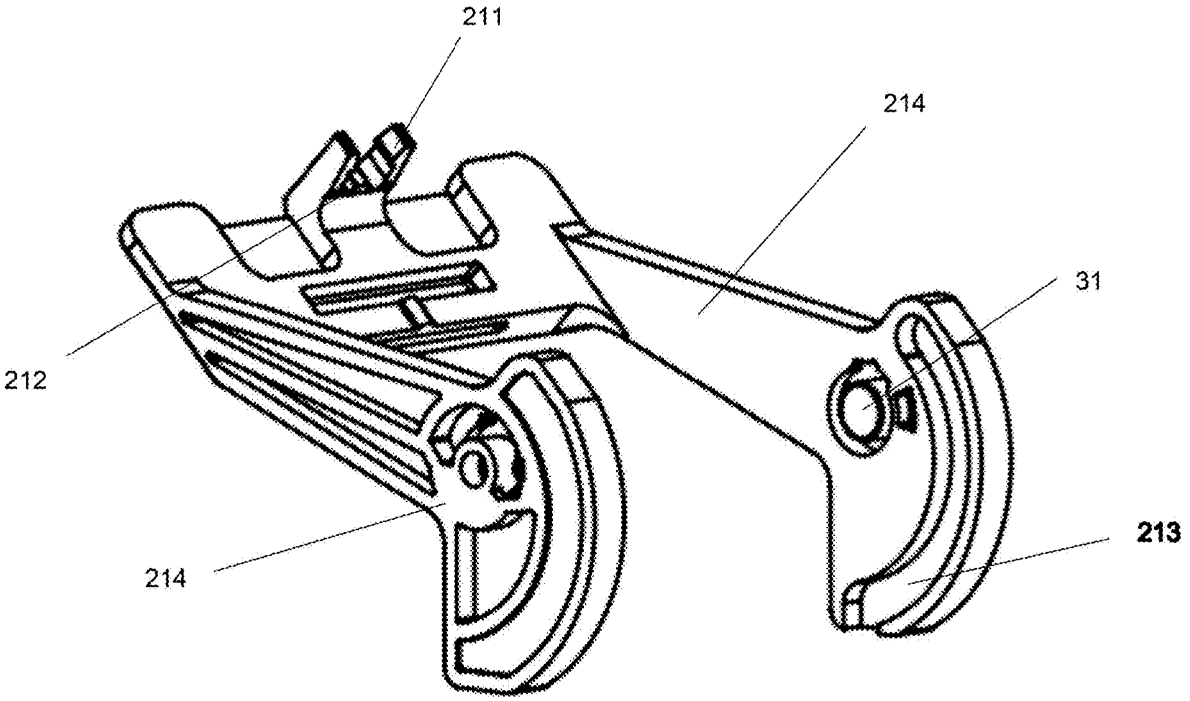
FIG. 6 shows in a schematic diagram a perspective view of a connector system having a corresponding locking clip and recess in accordance with the present disclosure.

FIG. 6 shows in a schematic diagram a perspective view of a connector system having a corresponding locking clip 21 and recess in accordance with the present disclosure.

Figure 7:
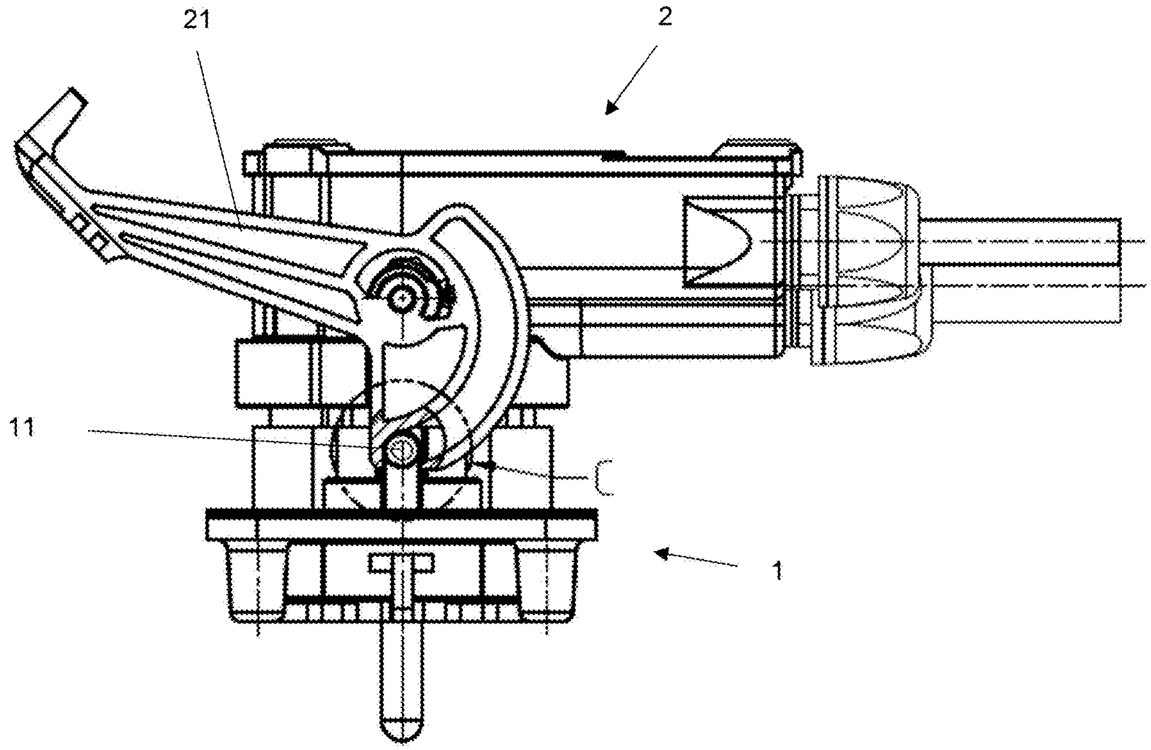
FIG. 7 shows in a schematic diagram plugged connectors with the locking clip fully open.

FIG. 7 shows in a schematic diagram plugged connectors 1, 2 with the locking clip 21 fully open.

Figure 8:
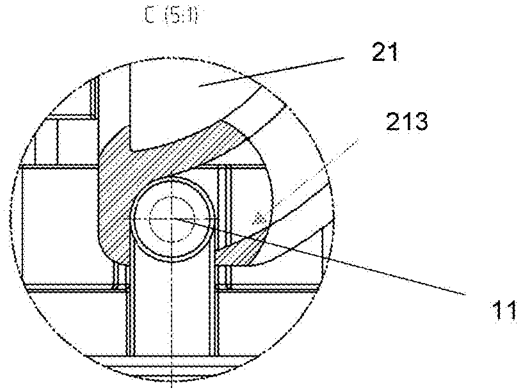
FIG. 8 shows an enlarged schematic view of FIG. 7 and illustrates the insertion of a locking element of a connector into the corresponding recess of a locking clip of a second connector.

FIG. 8 shows an enlarged schematic view of FIG. 7 and illustrates the insertion of a locking element 11 of a connector 2 into the corresponding recess of a locking clip 21 of the second connector 1. With regard to further advantageous embodiments of the device according to the present disclosure, reference is made to the general part of the description and to the appended claims in order to avoid repetitions.

Finally, it is expressly pointed out that the exemplary embodiments described above of the device according to the disclosure serve only to explain the claimed teaching, but do not limit it to the exemplary embodiments.

LIST OF REFERENCE NUMBERS

1 Second connector
2 Electrical connector
21 Locking clip
211 Latching receptacle
212 Protrusion
213 Recess
214 Side arms
22 Coupling housing
31 Hinges
4 Detail
41 Actuator
410 Solenoid
411 Blocking element

42 Latching apparatus
421 Sealing element
422 Latching mechanism
423 Passage
424 Second sealing geometry
425 Remote side
427 Latching element
428 Latching hook
429 Insertion slope
43 Acoustic and/or optical apparatus The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical connector, comprising:

a coupling housing for connection to a corresponding second electrical connector, wherein a locking clip is arranged on the coupling housing such that the locking clip can be moved from an open position into a closed position, wherein the locking clip has a recess into which a locking element of the second electrical connector can be inserted in the open position of the locking clip, and wherein, in the closed position of the locking clip, the locking element is arranged in the recess in such a manner that the coupling housing is form-fit and/or force-fit connected to the second electrical connector; and a latching apparatus with at least one latching element arranged on the coupling housing, wherein the at least one latching element engages in a latching receptacle of the locking clip in the closed position of the locking clip; and an electrically movable blocking element arranged to inhibit movement of the at least one latching element in a blocking position.

2. The electrical connector according to claim 1, wherein the at least one latching element is an elastic latching element.

3. The electrical connector according to claim 2, wherein two latching elements are arranged, and wherein the blocking element is arranged between the latching elements in the blocking position.

4. The electrical connector according to claim 2, wherein the at least one latching element has a latching hook arranged at a free end.

5. The electrical connector according to claim 3, wherein the two latching elements are arranged in mirror image of one another.

6. The electrical connector according to claim 1, wherein the locking clip has two side arms and a connection element connecting the side arms, and the latching receptacle is arranged on the connection element.

7. The electrical connector according to claim 6, wherein the latching receptacle is arranged on the connection element centrally between the side arms.

8. The electrical connector according to claim 1, wherein a latching protrusion is arranged on the latching receptacle, behind which the at least one latching element engages in the closed position of the locking clip.

9. The electrical connector according to claim 8, wherein an insertion slope is arranged on the latching protrusion of the latching receptacle to facilitate insertion of the at least one latching element.

10. The electrical connector according to claim 8, wherein the at least one latching element engages behind the latching protrusion with a latching hook.

11. The electrical connector according to claim 1, wherein the latching apparatus has a sealing element, and wherein a passage for the blocking element is arranged on the sealing element.

12. The electrical connector according to claim 11, wherein at least one sealing lip is arranged on and/or in the passage and/or at least one sealing lip is arranged on a side of the sealing element facing away from the at least one latching element.

13. The electrical connector according to claim 12, wherein the at least one sealing lip on and/or in the passage is a circumferential sealing lip and/or the at least one sealing lip on the side of the sealing element facing away from the at least one latching element is a circumferential sealing lip.

14. The electrical connector according to claim 1, wherein the blocking element is arranged on the coupling housing.

15. The electrical connector according to claim 1, wherein the blocking element is pin-shaped, elliptical, or disc-shaped and/or the blocking element is arranged as an eccentric shaft.

16. The electrical connector according to claim 1, wherein the blocking element is movable via an electric drive.

17. The electrical connector according to claim 16, wherein the electrical drive is a linear actuator and/or a rotary actuator, in particular a solenoid and/or a shape memory actuator and/or a servomotor and/or a rotary solenoid.

18. The electrical connector according to claim 1, wherein a protrusion is arranged on the locking clip, wherein by moving the locking clip into an emergency unlocking position, the at least one latching element can be pushed away from the blocking element by the protrusion.

19. The electrical connector according to claim 1, wherein an acoustic apparatus and/or an optical apparatus is/are arranged such that an acoustic and/or optical signal can be generated to indicate the closed and/or the open position of the locking clip and/or to indicate a current flow.

20. A connector system, comprising an electrical connector according to claim 1 and a second electrical connector having at least one locking element.

* * * * *